Patented Apr. 19, 1932

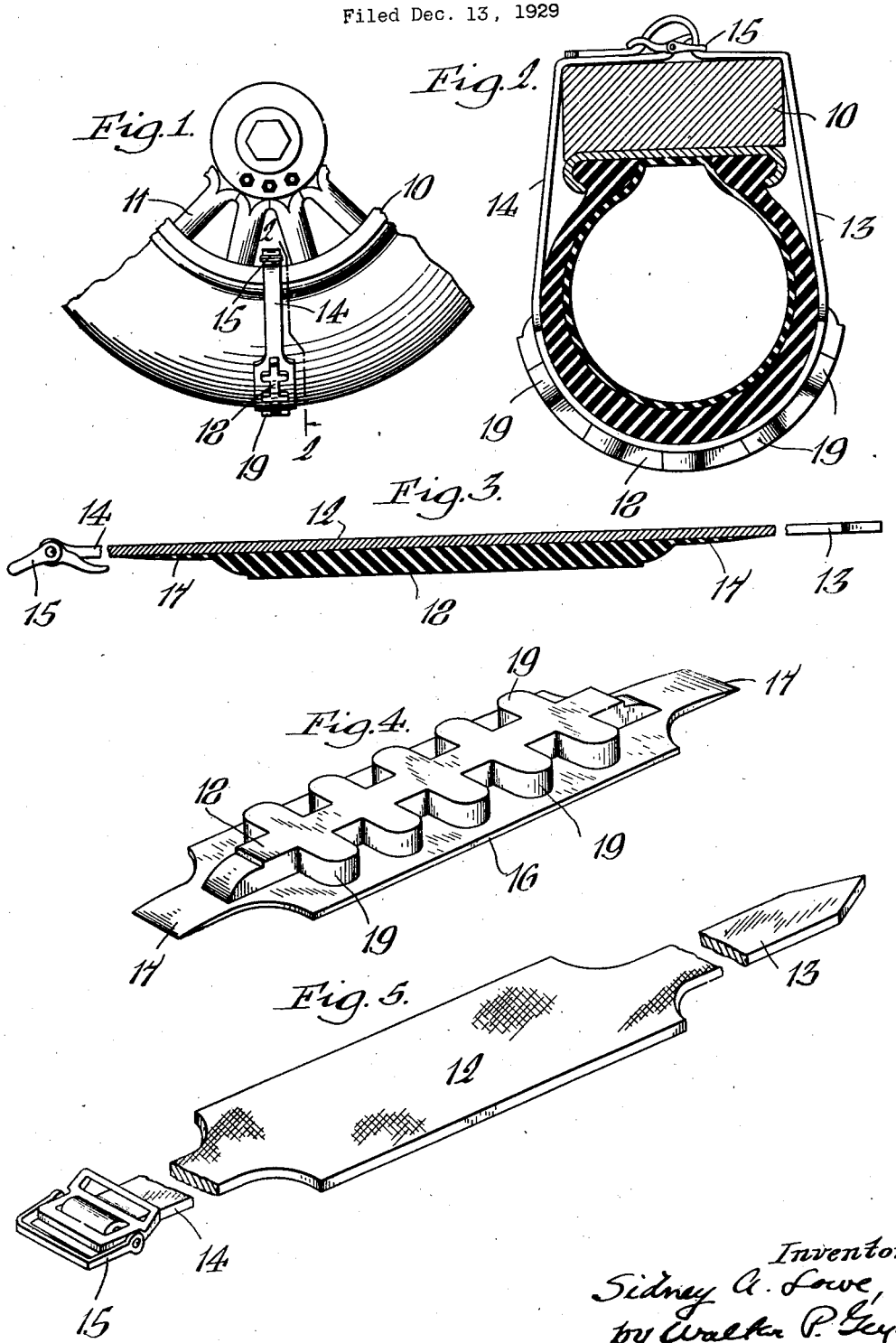

1,854,616

UNITED STATES PATENT OFFICE

SIDNEY A. LOWE, OF BUFFALO, NEW YORK

ANTISKID DEVICE

Application filed December 13, 1929. Serial No. 413,724.

This invention relates to improvements in anti-skid devices for motor vehicles.

One of its objects is the provision of a simple, durable and inexpensive anti-skid device which may be readily applied to and removed from the wheel, and which is designed to fit over any size of tire.

Another object of the invention is to provide a reliable attachment of this character which will effectually prevent skidding and slippage or spinning of the wheels on icy or wet pavements, and which will not in any way injure the tread surface of the tire.

In the accompanying drawings:—

Figure 1 is a fragmentary side elevation of a vehicle wheel showing one of my anti-skid devices applied thereto. Figure 2 is an enlarged cross section taken on line 2—2, Figure 1. Figure 3 is a central longitudinal section, partly in elevation, of one of the anti-skid bands in its detached, flat condition. Figures 4 and 5 are perspective views of the tread member and attaching member of the anti-skid device, respectively.

Similar characters of reference indicate corresponding parts throughout the several views.

These anti-skid devices have been designed for individual application at different points about the wheel 10 and are adapted to be securely fastened about the tire and rim, say between the wheel spokes 11. Any number of the devices, say three or more, may be applied to each wheel depending on the condition of the roadway.

Each anti-skid device is substantially strap-like in shape and consists of a band or back member 12 of flexible material, preferably of rubberized fabric, and of a length to extend transversely around the tire and be adaptable to tires of varying cross-sections. The end portions 13, 14 of the back member are, by preference, of less width than the central or body portion thereof, the end 14 having a suitable buckle 15 attached thereto and with which the other end 13 is adapted to be securely fastened for reliably holding the device in place on the tire. The central portion of the back member 12 is adapted to overlie the tread and adjoining sides of the tire and applied to its exterior face is a tread surface of molded rubber consisting of a comparatively thin body portion 16 of approximately the same shape as the corresponding portion of the back member and extensions 17 at its opposite ends overlying the adjoining inner ends of the portions 13, 14 of said back member. The latter and the rubber tread surface are vulcanized to form an integral structure.

On its surface the tread portion 16 of the device has a substantially centrally-disposed longitudinal rib 18 and transverse ribs 19 projecting from the opposite edges of said longitudinal rib. These ribs, in the applied position of the device on the tire, extend transversely and circumferentially of the tire, respectively, and thereby effectually act to prevent spinning of the wheel as well as side skidding.

By constructing the anti-skid device in this manner, a unitary structure is provided free from separable connections or loose, breakable fittings, rendering it always intact and ready for use. Furthermore, the device is semi-elastic and can be fitted snugly and firmly to the tire in a minimum period of time and with comparative ease; it does not in any way injure or damage the tire and it does not produce objectionable noises or interfere with the riding qualities of the car.

I claim as my invention:—

1. An anti-skid device, comprising a flexible, semi-elastic band of rubberized fabric adapted to extend transversely about the tire and felly of a wheel and including a central, substantially rectangular-shaped portion and relatively narrow end attaching portions, one of the end portions having a buckle to adjustably receive the companion end portion in friction-holding engagement therewith, and a tread member having integrally formed anti-skid projections thereon overlying the central portion of said band and consisting of a relatively thin strip of rubber integrally united with the central band portion, said tread member having extensions at its ends overlying the adjoining end portions of the band and terminating at its ends flush with the surface of said band.

2. An anti-skid device, comprising a band of flexible material having a wide central portion adapted to bear on the tire, reduced end portions adapted to pass around the tire and felly to secure the band in position, a tread member secured to said central portion and having parts overlapping the reduced end portions, and means for securing said end portions together.

SIDNEY A. LOWE.